(12) United States Patent
Vogt et al.

(10) Patent No.: US 7,641,517 B2
(45) Date of Patent: Jan. 5, 2010

(54) KEYED SOCKET AND LAMP BASE

(75) Inventors: Karl-Wilhelm Vogt, Ense (DE); Tobias Brown, New Paltz, NY (US); Markus Pieper, Arnsberg (DE); Albert M. Cavallaro, Durham, NH (US); Roger B. Hunt, Jr., Medfield, MA (US); Dennis S. Holt, Medfield, NH (US)

(73) Assignees: BJB GmbH & Co. KG, Arnsberg (DE); Osram Sylvania Inc., Danvers, MA (US)

( * ) Notice: Subject to any disclaimer, the term of this patent is extended or adjusted under 35 U.S.C. 154(b) by 0 days.

(21) Appl. No.: 12/069,732

(22) Filed: Feb. 12, 2008

(65) Prior Publication Data

US 2009/0203260 A1     Aug. 13, 2009

(51) Int. Cl.
    *H01R 13/66*     (2006.01)
(52) U.S. Cl. .................... 439/620.02; 439/336; 362/651
(58) Field of Classification Search ............ 439/620.02, 439/227, 232, 680, 335, 336, 677; 315/178; 362/260, 376–378, 649, 651, 655
See application file for complete search history.

(56) References Cited

U.S. PATENT DOCUMENTS 6,779,911 B2 * 8/2004 Chang ........................ 362/430
6,824,409 B2 * 11/2004 Thiele et al. ................. 439/242
7,275,854 B2 * 10/2007 Dorleijn et al. .............. 362/649
2007/0202738 A1 * 8/2007 Ciancanelli et al. ......... 439/552

* cited by examiner

*Primary Examiner*—Edwin A. Leon
*Assistant Examiner*—Vanessa Girardi
(74) *Attorney, Agent, or Firm*—Andrew Wilford

(57) ABSTRACT

A lamp base has a projection that carries lamp contacts and has an outer surface formed with retaining formations arrayed with irregular spacing. A socket forms a recess into which the projection can be inserted with play and apertures provided with contacts engageable with the lamp contacts. Retaining formations in the socket fit with the lamp-base retaining formations in only one defined angular alignment of the lamp base and the socket. The projection has a central plug projecting toward the socket and forming a lamp key coded for a predetermined lamp wattage. The socket has a hole corresponding to the plug and itself forming a socket key coded for the maximally admissible lamp wattage for the socket. The lamp base only fits into the socket when the lamp wattage indicated by the lamp key does not exceed the maximally admissible lamp wattage defined by the socket key.

14 Claims, 4 Drawing Sheets

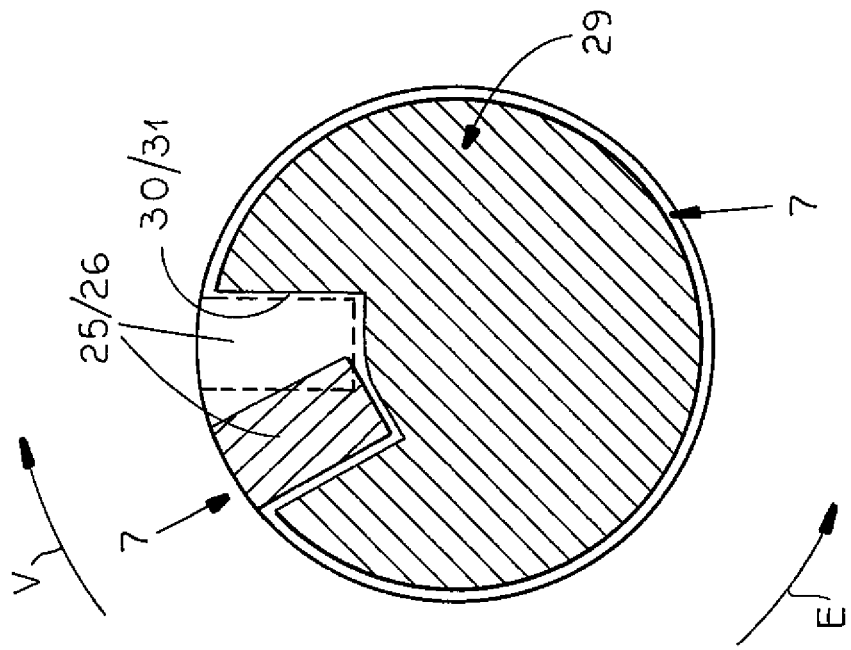
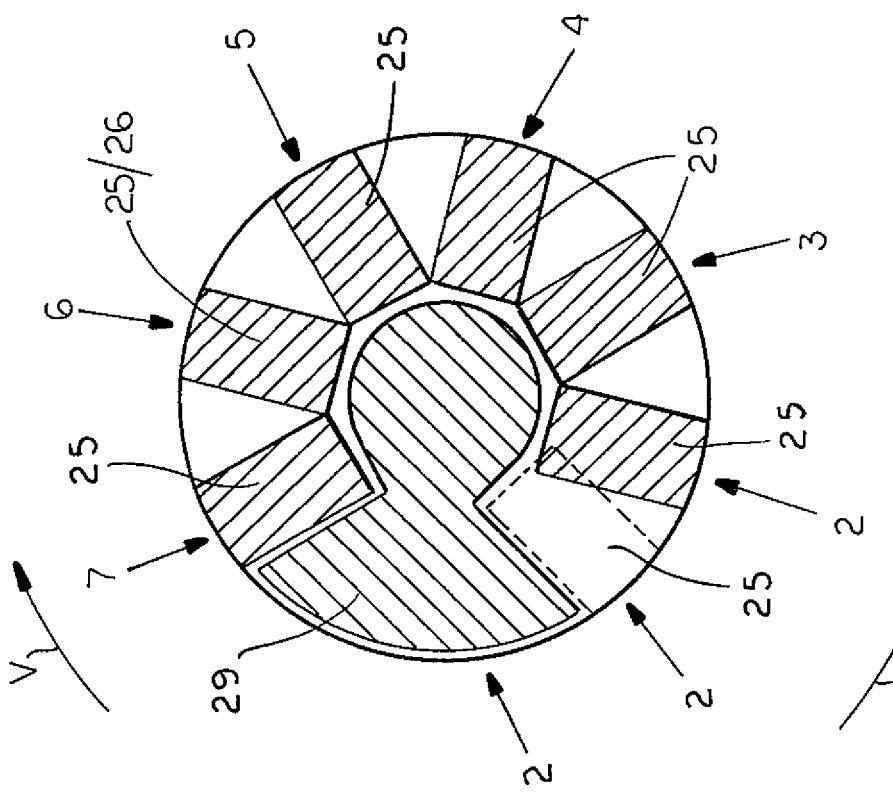

KEYED SOCKET AND LAMP BASE

FIELD OF THE INVENTION

The invention relates to a device for holding a lamp, in particular a compact fluorescent lamp in a light fixture.

BACKGROUND OF THE INVENTION

Such a device is known, e.g. from the 2007 product catalog of the applicant as a holder for GR14q compact fluorescent lamps of the PL-R Eco type of the Philips company.

Another device with which a compact fluorescent lamp 2 GB-1 can be installed by executing a plug-and-rotate motion is known from EP 1 348 902 (U.S. Pat. No. 7,275,854).

The considerable advantage of compact fluorescent lamps for illumination is due to their high illuminating power with low current consumption and their long service life. There are compact fluorescent lamps on the market in various wattage levels, classified according to their number of watts, so that there is a lamp with a suitable wattage for every application.

It is advantageous for the manufacturers of lighting units if the lamp holder or socket of a standard device only can accept lamps with a predetermined or a maximally admissible wattage and/or of a predetermined lamp type in the light fixture. This can ensure that the body of the light fixture, the reflector or, in the case of installed light fixtures, the parts surrounding the light fixtures are protected from too much heat from the lamp. Such a device did not exist up to the present in standard devices for holding compact fluorescent lamps.

OBJECT OF THE INVENTION

It is therefore an object of the present invention to provide a device for holding compact fluorescent lamps in which a lamp base can be fixed in a socket by a plug-and-rotate motion in such a manner as to can ensure that only suitable lamps can be inserted into the light fixture.

SUMMARY OF THE INVENTION

This object is attained by a device for holding a lamp IN which the cylindrical projection of the lamp base has a central plug projecting toward the socket, which plug forms a lamp key coded for a predetermined lamp wattage, and that the floor of the socket has a hole corresponding to the plug, which hole forms a socket key coded for the maximally admissible lamp wattage for the socket, and that the lamp base can only be inserted into the socket when the lamp wattage indicated by the lamp key does not exceed the maximally admissible lamp wattage defined by the socket key.

The outer socket part key and the inner socket part key make it possible to prevent the insertion of lamps into light fixtures whose wattage is too great for the particular model of light fixture. Thus, this can effectively prevent damage from high temperatures as a consequence of the radiation of heat of the lamp inside the light fixture for the body of the light fixture or for the reflector as well as outside of the light fixture on mounting parts or parts of the surroundings. However, at the same time the key combinations make it possible to insert lamps with a lesser wattage than the maximal wattage permitted for the socket into a light fixture so that the user of the light fixture in question is otherwise free in his selection of the lamp wattage and illuminating wattage.

However, it is conceivable in one embodiment that the lamp base can only be fitted into the socket if the lamp key and the socket key are coded for the identical lamp wattage.

However, the embodiment is preferred in which the socket key characterizing a predetermined lamp wattage allows the insertion of all lamp bases whose lamp keys coded for an identical or lesser lamp wattage.

Concretely speaking, the keys are designed in such a manner that the socket key is constituted as a lug directed radially inward to the hole center and that the lamp key is designed as an outwardly open cutout of the plug.

Lamp bases for lower lamp wattages have wider outwardly open cutouts on the plug side than lamp bases for higher lamp wattages.

In conformity therewith the lug on the socket in sockets for higher admissible lamp wattages is offset relative to those with lower admissible lamp wattages by a predetermined angle counter to the rotary movement to be performed for installation.

A concrete embodiment provides that the offset of the angle is 45° per lamp wattage range and the outwardly open cutout is increased by 45° per lamp wattage range toward the rotary movement to be performed for fixing.

The previously cited concrete angles result in seven possible keys, taking into account tolerances for structural components, with which an insertion of a lamp with non-admissible lamp wattage is reliably avoided, taking into account the rotary motion of 30° necessary for fixing. In this manner the number of keys is maximized while ensuring safety.

Just as a lamp wattage that is too high, even the wrong lamp type can result in damage to the light fixture. This can be imagined, e.g. if the light fixture for a lamp is intended for a long cylindrical lamp body and instead a lamp with a substantially spherical lamp body is inserted. The spherical lamp body has a greater diameter than the cylindrical lamp body and as a consequence less distance to the body of the light fixture. Even this can result in an inadmissible heating of the body of the light fixture, of the reflector or of the surroundings, resulting in thermal damage.

The initially posed problem of a device is solved in this sense in that the cylindrical projection on the lamp base comprises at least one key recess on its outer circumference, which recess characterizes a predetermined lamp type and the collar on the socket has at least one key projection on its inner circumference and also coded for a predetermined lamp type, which socket can only be fitted into the socket if the key recess and the key projection are coded for compatible lamp types.

A preferred embodiment provides that up to five key recesses and up to five corresponding key projections are provided.

For special applications an embodiment is provided that is characterized in that the socket can only be fitted into the socket if the key recess and the key projection are coded for identical lamp types.

Finally, the retaining formations on the lamp base are designed as retaining projections and the retaining formations on the socket are designed as L-shaped grooves so that the inner and outer retaining formations form a type of bayonet lock.

BRIEF DESCRIPTION OF THE DRAWING

The drawings will clarify further advantages of the invention. Therein:

FIG. 5 shows a schematic view of the cooperation of the lamp key and the possible socket keys, FIG. 6 shows a schematic view of the cooperation of a further lamp key with its associated socket key.

SPECIFIC DESCRIPTION

Figure 2:
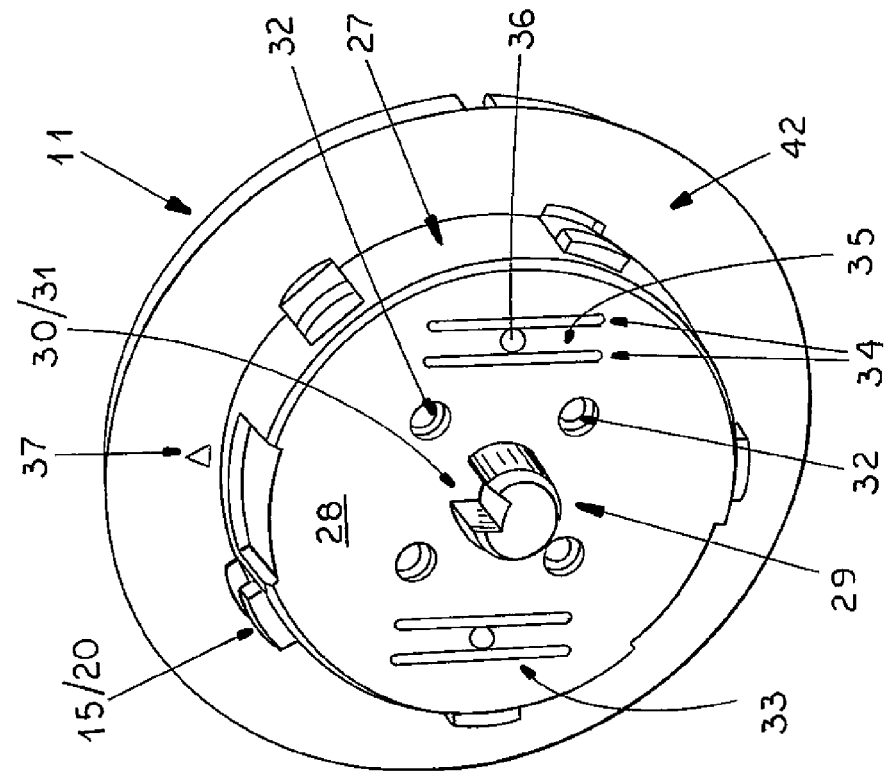
FIG. 2 shows a socket in accordance with the invention for the socket according to FIG. 1.

A socket is identified with reference numeral 10 and a lamp base with reference numeral 11 in all figures.

Figure 1:
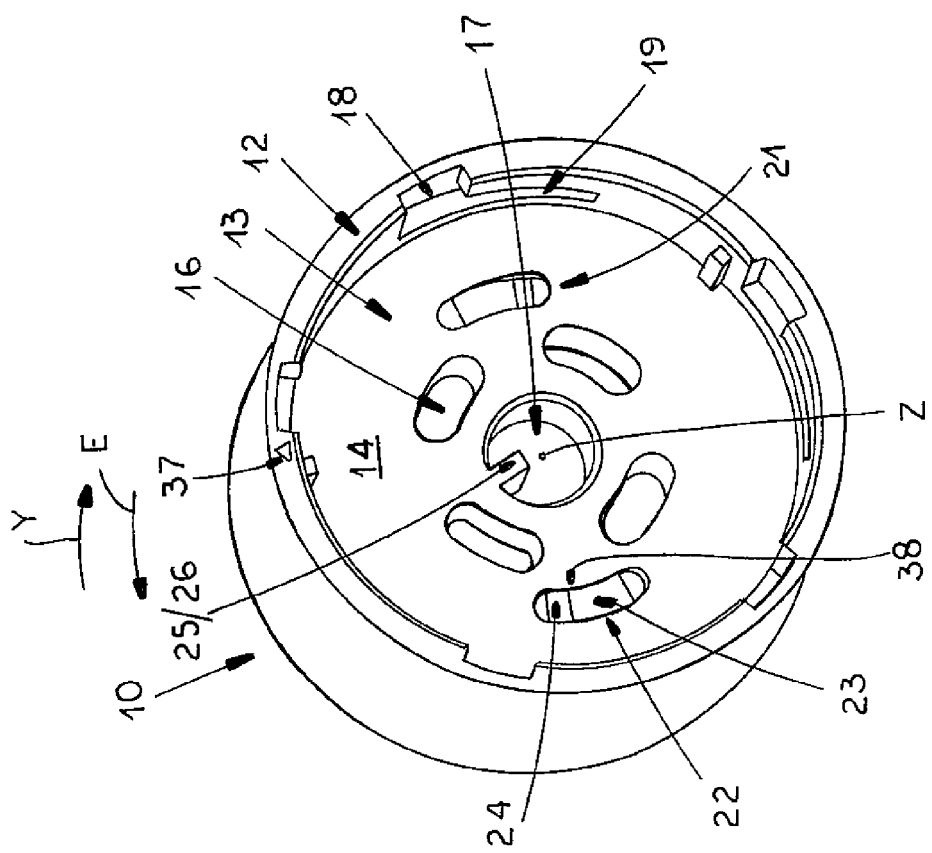
FIG. 1 shows a socket in accordance with the invention.

As is apparent in particular from FIG. 1, the socket 10 is a substantially cylindrical body having a collar 12. This collar 12 delimits a cup-shaped recess 13. The cup-shaped recess 13 has a floor 14 formed with a central hole 17 in addition to four apertures 16 provided with unillustrated socket contacts. Approximately L-shaped collar grooves 18 form retaining formations 19 that cooperate with retaining formations 15 of the lamp base 11 formed as retaining projections 20. Furthermore, the floor 14 of the recess 13 has a latches 21. They are formed as circularly arcuate recesses formed in the floor 14 and having sawteeth 22 with, relative to a rotation sens V, a shallow flank 23 and a steep flank 24. Finally, a lug 25 projects in the central hole 17 toward a center Z and functions as a socket key 26. Here it is the socket key 26 of key pair 7 according to FIG. 7.

FIG. 2 shows a lamp base 11 by way of example. It comprises a substantially cylindrical projection 27 extending from a base fitting 42 and having the above-mentioned retaining projections 20 on its outer surface. The cylindrical projection 27 forms a lamp end face 28 from which projects a central plug 29. This latter projects toward the socket 10. An outwardly open cutout 30 forms a lamp key 31 of the invention.

Figure 7:
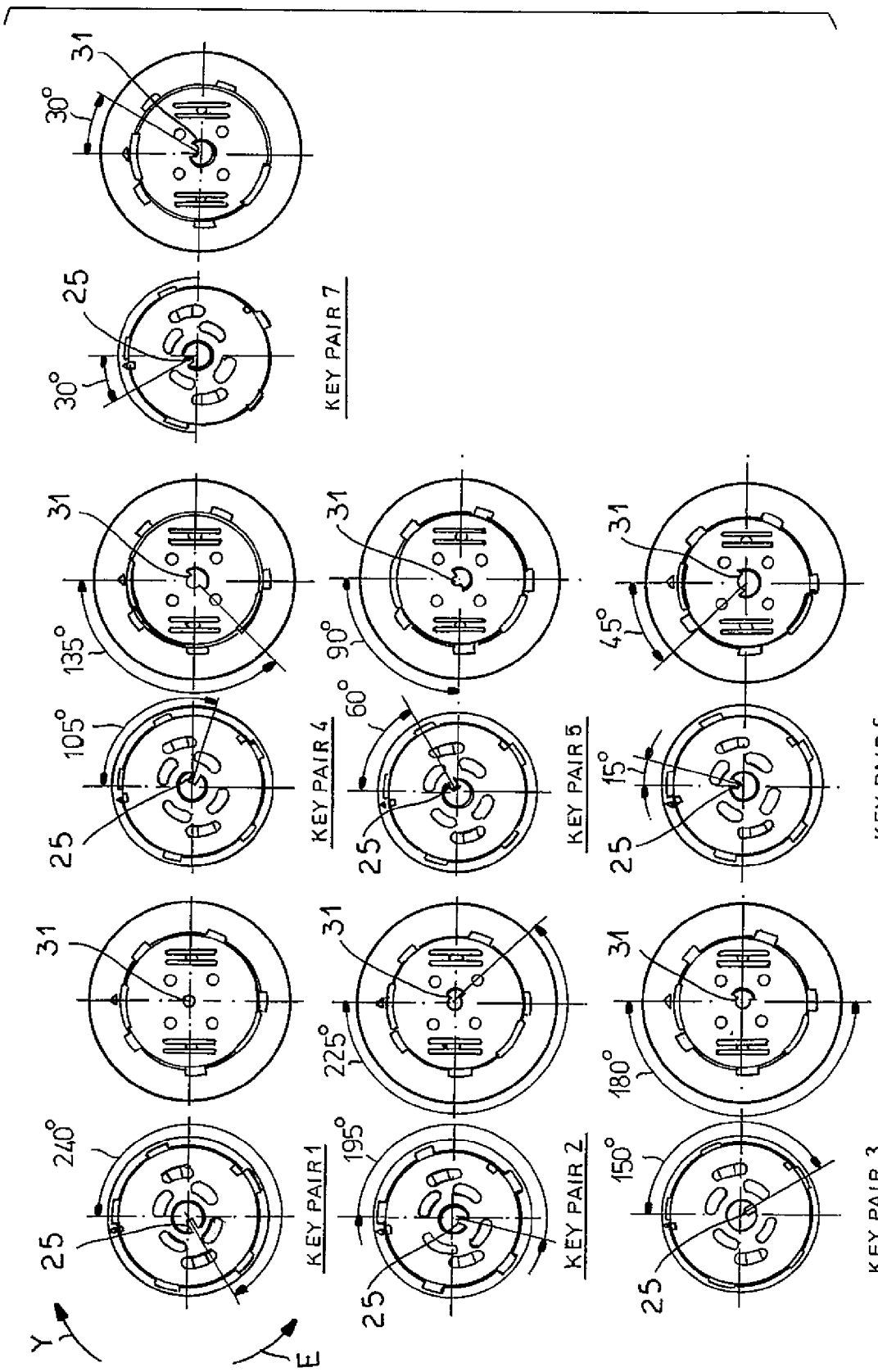
FIG. 7 shows a survey of the possible lamp keys and socket keys in a concrete embodiment of the invention.

The outwardly open cutout corresponds to the lamp key 31 of key pair 7 in FIG. 7.

In FIG. 2 the lamp end face 28 is provided with four seats 32 for unillustrated contact pins. Furthermore, the lamp end face 28 forms with the socket retaining formations 21 a catch 33. Each catch is formed by two parallel and spaced slots 34 in the lamp end face 28 forming elastically deformable web 35 in the floor 38 between the two notches 34, which web functions like a leaf spring. A projection 36 cooperates with the sawtooth 22 on the socket.

The L-shaped collar grooves 18 of the socket 10 that form the retaining formations 19 are nonuniformly angularly spaced from each other. Retaining projections 20 on the lamp base fit with the collar grooves 19. The retaining projections 20 are angularly spaced from each other on the circumference and the distances between each corresponding collar grooves 18 or retaining projections 20 and the respective next collar groove 18 and/or retaining projection 20 are the same. This ensures that the lamp base 11 can only be inserted into socket 10 in a one angular position relative to the socket since only then can each retaining projection 20 fit into its corresponding collar groove 18.

It can be readily be seen with reference to FIGS. 1 and 2 how the lamp base 11 is fitted into the socket 10 and locked therein. The lamp base 11 is aligned with its plug 29 to the hole 17, care being taken that the lug 25 is aligned with the cutout 20 of the central plug 29. A triangular symbol 37 carried on the lamp base 11 as well as on the socket 10 serves to show the final position of both parts relative to each other. In this position retaining formations 15 and 19 can fit together.

The lamp base 11 is now inserted into the socket 10 with the retaining projections 20 fitting into the legs of the L-shaped collar grooves 18 that extend perpendicular to the socket floor 14. At the same time the unillustrated lamp contact pins engage into the inner part apertures 16 and the protections 36 of the inner part catch 33 come to rest in front of the shallow flank 23 of the sawtooth 22 in the corresponding recess.

Subsequently, the lamp base is moved about 30° in the retaining rotational sense V so that retaining projections 20 move into the legs of the collar grooves 18 extending parallel to the socket floor 14, thereby effecting a bayonet-like locking of the lamp base 11 in the socket 10. At the same time engagement projections 36 pass over apices 38 formed by the flanks 23 and 24 of the sawteeth 22 and engage behind the apices 38. Thus, accidental loosening of the bayonet locking of socket part 11 and socket part 10 is prevented. In order to unlock, socket part 11 is moved opposite socket part 10 in a rotational loosening sense E (unlocking direction) by about 30° and then pulled out of the outer socket part.

FIGS. 3 and 4 again show views of the socket 10 and the lamp base 11. A comparison with FIG. 7 shows that here the socket 10 and the lamp base 11 of a key pair 1 are shown. The central plug 29 is very small since here its recess extends over 360°. For technical manufacturing reasons and since this characterizes the lowest illuminating wattage, the lamp that can be safely used into this socket 10 does not even need the plug 29 shown in FIG. 4.

Figure 4:
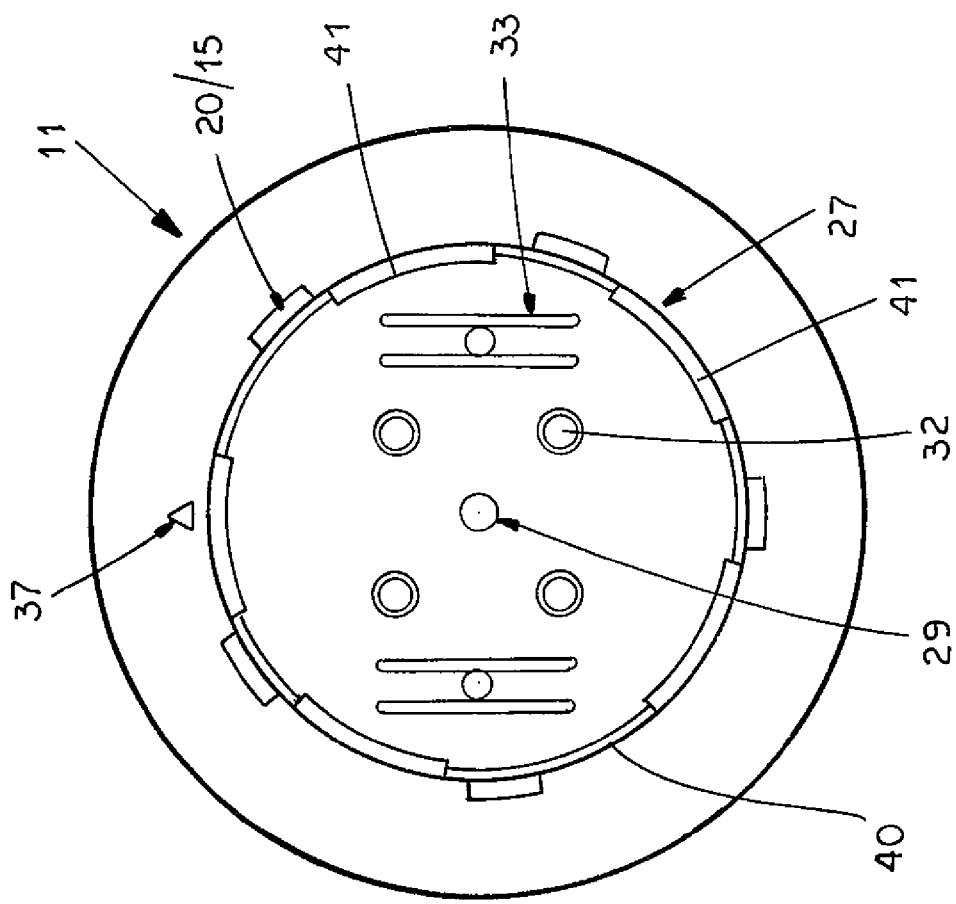
FIG. 4 shows a lamp base according to FIG. 2 in a modified embodiment.
Figure 3:
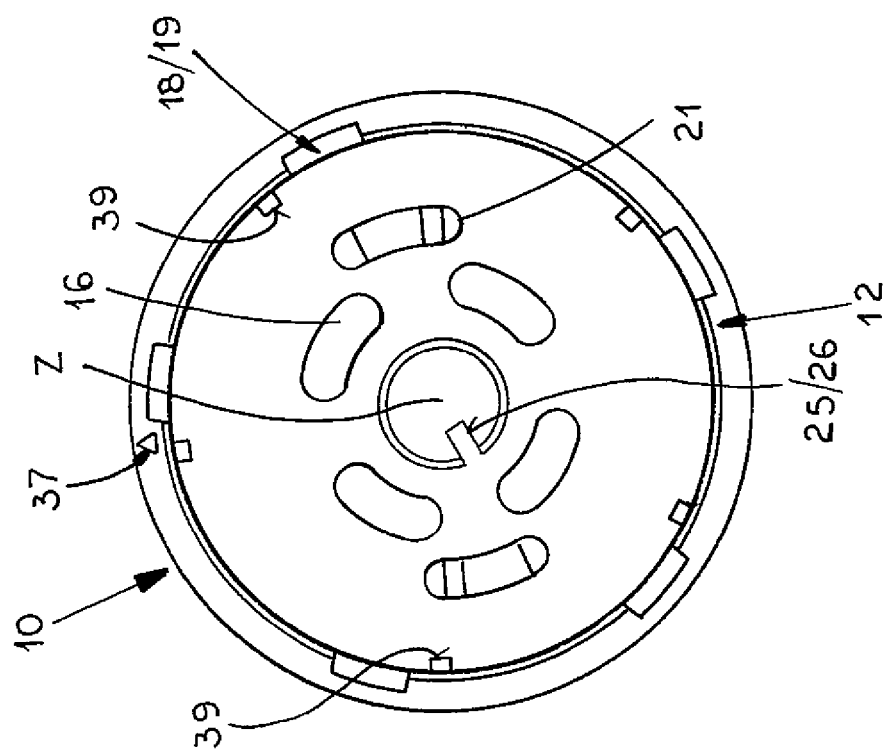
FIG. 3 shows a socket according to FIG. 1 in a modified embodiment.

An alternative key for coding to usable lamp types will be described with reference to FIGS. 3 and 4. As mentioned above excessive wattages can result in heat damage in a light fixture or in the surroundings the light fixture as can also lamp types that are incompatible with the light fixture. Both keys can be used in combination on the lamp base 11 and the socket 10, as in the illustrated embodiment according to FIGS. 3 and 4. However, it is perfectly conceivable that predetermined lamp types are also prevented from being used in predetermined light fixtures via the subsequently described key system.

Key projections 39 formed on the socket on the inner surface of the collar 12 and projecting toward the hole center Z serve as key elements. An inner surface 40 of the inner part cylindrical projection 27 is formed with key recesses 41, also termed key windows, corresponding to the projections 39. The lamp base 11 can only be inserted into the socket 10 when the number and orientation of the key recesses 41 of the lamp base 11 correspond at least to the key projections 39 of the socket 10. The lamp types admissible for a socket can be characterized by the key protections 39. The key recesses 41 formed on the lamp base 11 also characterize a lamp type. With this key system light fixtures can be provided with sockets 10 that only allow use of a predetermined lamp type or of a group of lamp types compatible with each other.

FIGS. 5 and 6 schematically show the cooperation of the lamp keys 31 and socket keys 26 in two examples. FIGS. 5 and 6 are schematic sectional views parallel to the socket floor 14 through the socket 10 with the inserted lamp base 11, only the area of the central hole 17 with the central plug 29 fitting in it being shown.

FIG. 6 shows the lamp key 31 and the socket key 26 according to FIGS. 1 and 2. This corresponds to the key pair 7 according to FIG. 7. The lug 25 is shown in dotted lines and hatched. The lamp base 11 is inserted into the socket 10 in the position of dotted-line lug 25 at the cutout 30. Then lamp base 11 is turned in the rotational sense V so that the lug 25 is now in the hatched position. The lamp base 11 is locked in the socket 10.

FIG. 5 shows the socket 10 with all conceivable key lugs 25 (identified at 2 to 7 corresponding to key pairs 2 to 7 in FIG. 7), in which a key plug 29 of the key pair 2 is inserted. Again, the lug 25 of the key pair 2 is shown in dotted lines in the starting position. The hatched view of the key lug 2 corresponds to the locked position. To this end the key plug 29 of the lamp base 11 has been turned relative to the socket 10 in the rotational sense V (retaining direction).

Comparison of FIGS. 5 and 6 shows that a key plug 29 of key size 7 can not fit into a socket that has a key lug 25 of sizes 2 to 6. This is ensured by the previously described particular nature of retaining formations 15 and retaining formations 19 that ensure that the socket 10 and the lamp base 11 can be fitted together only in a one relative angular position.

In a concrete embodiment of the invention the lamp key 31 and the socket key 26 are designed in such a manner that there is a total of seven key pairs as shown in FIG. 7. There is therefore the possibility of associating a key pair with each of seven different lamp wattage ranges.

FIG. 7 shows the socket 10 and the lamp base 11 of the particular key pairs always in a typical alignment and in the end position of the socket. This can be readily recognized from the particular triangular symbol 37.

It must be imagined for the interfitting of the socket 10 and the lamp base 11 that the lamp base 11 of each key pair is fitted into the socket 10 by counterclockwise pivoting relative to the view plane.

The pairings of socket 10 and lamp base 11 shown in FIG. 7 form the keys in accordance with the following principle. The lamp bases 11 for lamps with a lower lamp wattage have larger outwardly open cutouts 30 on the particular lamp key 31 compared to lamp bases 11 for lamps with a higher lamp wattage. The outwardly open cutout is widened by 45° per stepped lamp-wattage range starting from the highest lamp wattage range. The widening of the outwardly open cutout 30 is effected in rotational sense V, relative to the lamp base 11 inserted in the socket 10. The widening of the outwardly open cutout 30 can be increased until the lamp key 31 of key pair 1 has a 360° outwardly open cutout, leaving only the center of the plug 29 standing as a rudimentary lamp key 31. Since the lamp of the lamp base 11 of the key pair 1 has the lowest lamp wattage, it can be inserted into every lamp base. Therefore, even the rudimentary lamp key 31 of the key pair 1 can be eliminated so that the lamp base of the key pair 1 can also make do entirely without the lamp key 31.

The socket 10 has the lug 25 as socket key. This lug is present in each key pair. The plug 25 is offset, starting from the lowest lamp wattage range, by 45° opposite to the rotational sense V, that is, in the rotational sense E, for every next-higher lamp wattage range.

In sum, the invention has two key systems between the socket 10 and the lamp base 11 available that are different but can be combined with one another and by means of which the use of the wattage or of a wattage range as well as of the type of unsuitable lamps and the consequent damage can be effectively avoided in light fixtures.

The invention claimed is:

1. A device for holding a lamp in a light fixture, the device comprising
a lamp base having a base fitting facing away from the lamp and from which extends a substantially cylindrical projection that carries lamp contact pins and has an outer surface formed with retaining formations arrayed with irregular spacing, and
a socket having an annular collar forming a cup-shaped recess into which the cylindrical projection can be inserted with play and a floor defining the recess and formed with apertures provided with contacts and receiving the lamp contact pins, retaining formations on the inner circumference on the collar being arrayed complementarily to the lamp-base retaining formations and interfittable with same in only one defined angular alignment of the lamp base and the socket, a bayonet-like retention of the lamp base in the socket being effected by a plug-and-rotate motion, the cylindrical projection of the lamp base having a central plug projecting toward the socket and forming a lamp key coded for a predetermined lamp wattage, the floor of the socket having a hole corresponding to the plug and itself forming a socket key coded for the maximally admissible lamp wattage for the socket, the lamp base only being insertable into the socket when the lamp wattage indicated by the lamp key does not exceed the maximally admissible lamp wattage defined by the socket key.

2. The device according to claim 1 wherein the lamp base can only be fitted into the socket if the lamp key and the socket key are coded for the identical lamp wattage.

3. The device according to claim 1 wherein the socket key characterizing a predetermined lamp wattage allows the insertion of all lamp bases whose lamp keys characterize an identical or lower lamp wattage.

4. The device according to claim 1 wherein seven lamp wattage ranges with seven corresponding key pairs are provided.

5. The device according to claim 1 wherein the socket key is designed as a lug directed radially inward toward a hole center and that the lamp key is designed as an outwardly open cutout of the plug.

6. The device according to claim 5 wherein lamp bases for lower lamp wattages have wider outwardly open cutouts on the plug side than lamp bases for higher lamp wattages.

7. The device according to claim 6 wherein the outwardly open cutout is widened by 45° per lamp wattage range in a rotation sense of movement for interconnection.

8. The device according to claim 5 wherein the lug on the socket in sockets for higher admissible lamp wattages is offset relative to those with lower admissible lamp wattages by a predetermined angle opposite to a rotational sense of movement for interconnection.

9. The device according to claim 8 wherein the angular offset of the angle is 45° per lamp wattage range.

10. A device for holding a lamp in a light fixture, the device comprising
a lamp base having a base fitting facing away from the lamp and from which extends a substantially cylindrical projection that carries lamp contact pins and has an outer surface formed with retaining formations arrayed with irregular spacing, and
a socket having an annular collar forming a cup-shaped recess into which the cylindrical projection can be inserted with play and a floor defining the recess and formed with apertures provided with contacts and receiving the lamp contact pins, retaining formations on the inner circumference on the collar being arrayed complementarily to the lamp-base retaining formations and interfittable with same in only one defined angular alignment of the lamp base and the socket, a bayonet-like retention of the lamp base in the socket being effected by a plug-and-rotate motion the cylindrical projection on the lamp base having at least one key recess on its outer circumference, the recess characterizing a predetermined lamp type and the collar on the socket having at least one key projection on its inner surface and also coded for a predetermined lamp type, the lamp base only being fittable into the socket if the key recess and the key projection are coded for compatible lamp types.

11. The device according to claim 10 wherein up to five key recesses and up to five corresponding key projections are provided.

12. The device according to claim 10 wherein the socket can only be fitted into the socket if the key recess and the key projection are coded for identical lamp types.

13. The device according to claim 10 wherein the retaining formations on the lamp base are designed as retaining projections and the retaining formations on the socket are designed as L-shaped grooves so that retaining formations and retaining formations form a bayonet latch.

14. The device according to claim 10 wherein the rotary movement corresponds to an angle of 30°.

* * * * *